United States Patent Office.

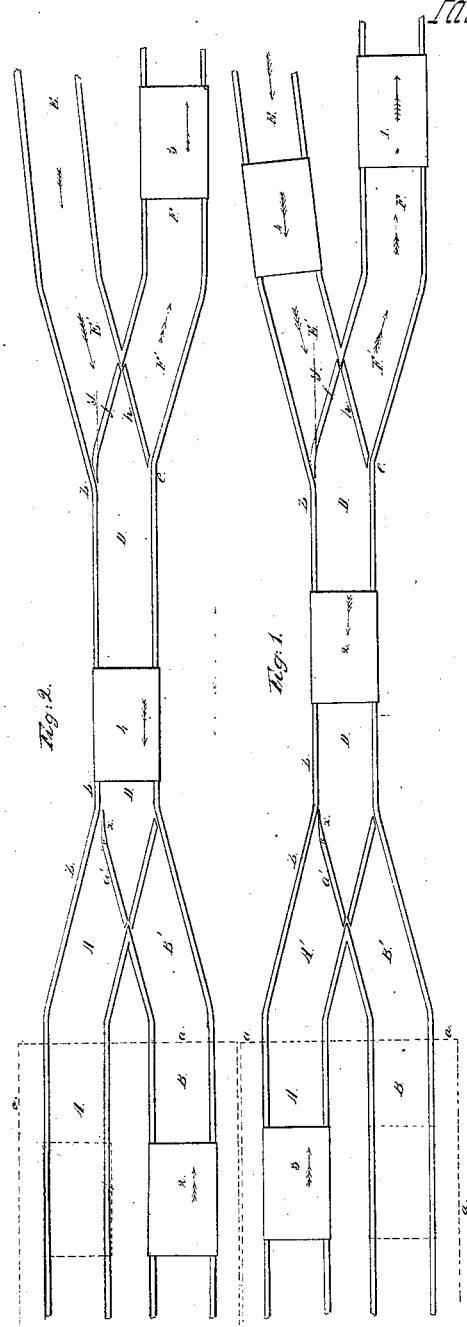

WILLIAM WHARTON, JR., OF PHILADELPHIA, PENNSYLVANIA.

IMPROVEMENT IN TRACKS AND SWITCHES FOR STREET-RAILWAYS.

Specification forming part of Letters Patent No. 37,654, dated February 10, 1863.

*To all whom it may concern:*

Be it known that I, WILLIAM WHARTON, Jr., of Philadelphia, Pennsylvania, have invented an Arrangement of Tracks and Switch for Passenger-Railway Termini; and I do hereby declare the following to be a full, clear, and exact description of the same, reference being had to the accompanying drawings, and to the letters of reference marked thereon.

My invention relates to an arrangement of tracks and switch for the depots, stations, or termini of city or passenger railways, in which two adjacent tracks are used, and in which the arrival of an incoming car on one track is the signal for the departure of an outgoing car from the adjacent track, my arrangement of tracks and switch being such that the incoming cars may be directed, the first to one track at the terminus, the second to the adjacent track, and so on, and that the outgoing cars may be directed on their proper course without the aid of the assistants heretofore required for moving a switch or switches for the purpose of accomplishing the same end.

In order to enable others skilled in the construction of city-railways to make and apply my invention, I will now proceed to describe its construction and operation.

On reference to the accompanying drawings, which form a part of this specification, Figures 1 and 2 represent plan views of my arrangement of tracks and switch for passenger-railway termini, the two views being alike with the exception of the position of the switch *x* and that of the several cars 1, 2, 3, and 4 on the tracks.

On reference to Fig. 1, A and B are two parallel tracks situated at the terminus of a passenger or city railway, the station or depot being represented by the red lines *a a*. These two tracks A and B from a point adjacent to the station converge and form the diagonal tracks A' and B', which unite in the single track D, the latter being continued in a straight course to a point where it is united to or communicates with the two diverging tracks E' and F', of which the tracks E and F are continuations. The track F is devoted to outgoing and the track E to incoming cars, as indicated by the arrows.

At the terminus of a city or passenger railway it is usual to place two tracks, A and B, the arrival of an incoming car on one track being the signal for the departure of the outgoing car from the adjacent track. Thus, the outgoing car 1, Fig. 1, which is traversing the track F, had prior to leaving the terminus occupied a position on the track B, the signal for the departure of this car from the terminus being the arrival of the incoming car 3 on the track A. Prior to the latter car leaving the terminus the incoming car 2 has to arrive at its destination on the track B, and prior to the latter car 2 leaving the said track B the incoming car 4 must have reached the track A. It will thus be seen that as the incoming cars arrive at the terminus one must take its place on the track B, the next on the track A, the third on the track B, and so on, the outgoing cars, whether from the track A or track B, having to traverse the straight track D in the first instance, and then the tracks F' and F.

At the termini of city-railways it has been usual heretofore to so arrange the tracks and the switch or switches connected therewith that the services of one or more attendants are required at points where they can operate the switches, so that both incoming and outgoing cars may be directed in their proper course.

The object of my invention has been to dispense with the services of assistants hitherto required, my improved arrangement of tracks and switch being such that the incoming cars will arrive at their proper position in the terminus, and the outgoing cars will take their proper course from the terminus, without the aid of an attendant or attendants.

It will be seen that the rail *a'* of the track B, at a point where the latter track forms a junction with the straight track D, terminates in a switch, *x*, of which such a limited movement is permitted that it can be made to assume the two positions illustrated in Figs. 1 and 2. This switch *x*, when in the position shown in Fig. 1, renders the rail *b* of the track D a continuation of the rail *a'* of the angular track B', so that the incoming car 2 must traverse from the track D onto the inclined track B', and thence onto the track B at the terminus, arriving at the position previously occupied by the outgoing car 1. (See Fig. 2.) After this arrival of the car 2 on the track B of the terminus, the car 3 must leave the same and traverse the track A', in passing from which onto the straight track D the flange of one of the front wheels of the car must necessarily pass between the rail $b$ and the switch $x$, thereby moving the same laterally to the position shown in Fig. 2. The track A is now ready for the reception of the next incoming car 4, Fig. 2, and this car in passing from the straight track D (the switch $x$ being open) must pass onto the inclined track A′ and must reach its proper destination at the terminus, after which the car 2 must leave the track B on its outgoing trip. In traversing from the inclined track B′ onto the straight track D one of the front wheels of the car 2 must bear against the inside of the switch $x$ and move the latter to the position which it previously occupied and which is shown in Fig. 1, so that the next incoming car must be directed by the switch onto the angular rails B′, from which it is transferred to the track B, recently vacated by the last outgoing car.

It will be seen without further description that the car which leaves one track at the station prepares the switch for guiding the next incoming car to the same track of the station. The rail $f$ of the inclined track F′ at the point where it meets or nearly meets the rail $b$ of the straight track D is bent to such an angle that the inside edge of the bent portion forms, as it were, a continuation of the inside edge of the rail $b$, as indicated by the red line $y$, Fig. 1. The tendency of the outgoing cars in traversing the track D being to continue in the same direct course as the track on leaving the latter, and the end of the rail $f$ forming a short continuation of the rail $b$, the transfer of the outgoing cars from the track D to the inclined track F′ is effected with ease and without the aid of assistants, at the same time the arrangement of the rails of the track F′ is such as not to interfere with the transfer of the incoming cars from the inclined track E′ to the straight track D.

Without further explanation it will be seen that incoming and outgoing cars are directed to their appropriate tracks without the aid of attendants.

I wish it to be understood that I do not desire to claim any of the within-described parts independently of the whole; but

I claim as my invention and desire to secure by Letters Patent—

The combination and arrangement, substantially as described, of the tracks A A′ B B′, switch $x$, track D, tracks E E′ and F F′, for the purpose specified.

In testimony whereof I have signed my name to this specification in the presence of two subscribing witnesses.

WM. WHARTON, JR.

Witnesses:
  HENRY HOWSON,
  D. ROWLAND.